United States Patent Office 3,440,007
Patented Apr. 22, 1969

---

3,440,007
METHOD OF REMOVING SULFUR DIOXIDE AND SULFUR TRIOXIDE FROM GASES AND PRODUCING AMMONIUM SULFATE THEREFROM
Tsugio Takeuchi, 1—48 Sakashita-cho, Chigusa-ku, Nagoya, Japan
No Drawing. Filed Mar. 15, 1965, Ser. No. 440,002
Claims priority, application Japan, May 2, 1964, 39/24,823
Int. Cl. C01c 1/24
U.S. Cl. 23—119        3 Claims

ABSTRACT OF THE DISCLOSURE

A process comprising contacting a combustion gas containing $SO_2$ and $SO_3$ with active carbon at a temperature ranging from room temperature to 250° C., to adsorb onto the active carbon the $SO_2$ and $SO_3$ contained in the combustion gas, which are subsequently oxidized with the oxygen and steam also present in the gas to form sulfuric acid on the active carbon, and then reacting the sulfuric acid with ammonia, to thereby recover the same as ammonium sulfate as well as to regenerate the active carbon.

---

This invention relates to a process for selectively removing sulfur compounds from furnace exhaust products and recovering said sulfur compounds as ammonium sulfate. More particularly, the invention relates to a process for removing from combustion gas the sulfur compounds contained therein and recovering said sulfur compounds as ammonium sulfate, which comprises a first step of contacting combustion gas discharged from industrial scale furnaces such as those in a power plant with active carbon at a temperature ranging from room temperature to 250° C., to thereby absorb onto the active carbon the sulfur compounds contained in the combustion gas, which subsequently react with the oxygen and steam also present in the gas to form sulfuric acid on the active carbon, and a second step of reacting the sulfuric acid formed on the active carbon with ammonia to form ammonium sulfate and separating the ammonium sulfate thus formed as well as regenerating the active carbon which then can be washed with water, dehydrated and recycled for use in the said first step.

The combustion gas discharged from furnaces in heat-engine power plant, petroleum refineries and petrochemical industrial factories, etc. contains sulfur compounds such as sulfur dioxide, sulfur trioxide and sulfuric acid which cause atmospheric pollution and also causes corrosion of the construction materials forming the passages from the furnaces to the flues. For this reason, various attempts have been made to remove the sulfur compounds from the combustion gas with economical advantage.

Such known processes include:

(1) A process in which a fuel added in advance with a finely divided or solubilized metallic oxide is used for combustion so that the sulfur compounds in the combustion gas are trapped by the metallic oxide; (2) a process for desulfurization by washing the combustion gas with an aqueous solution which is capable of dissolving the sulfur compounds in the said gas (liquid purification process); (3) a process for removing the sulfur compounds in the combustion gas in the form of sulfite or sulfate, by reacting same with a metallic oxide such as aluminum oxide or manganese oxide at a temperature up to 300° C. (dry purification process); and (4) a process for adsorbing the sulfur compounds in the combustion gas onto an adsorbent such as active carbon, silica gel, alumina, etc. (dry adsorption process).

Among the abovementioned, known process, in the dry adsorption process, the sulfur compounds so adsorbed are first oxidized by the oxygen in the combustion gas, and then are converted into sulfuric acid under the action of the steam also present in the gas. Among the variations of the dry adsorption process, that of using active carbon as the adsorbent first appeared most promising. However, such variation included a disadvantage in that the regeneration of the active carbon containing sulfuric acid was difficult, that is, the recovery of the sulfuric acid was difficult. This is so because, as the sulfuric acid adsorbed in the active carbon is conventionally extracted with water, only a dilute aqueous sulfuric acid solution is recoverable.

Recently, a process for the rengeneration of active carbon adsorbed with sulfuric acid which seemingly contains great promise became known, for example, U.S. Patent No. 2,992,065. This process, known as the Reinluft process, comprises heating the active carbon adsorbed with sulfuric acid to 350–450° C. in a gaseous atmosphere free of oxygen to decompose the sulfuric acid into carbon dioxide and sulfur dioxide, and re-using the remaining active carbon as the adsorbent. In this process, the sulfuric acid adsorbed in the active carbon is decomposed into water and sulfur trioxide due to heating, and the sulfur trioxide so formed reacts with the active carbon to form carbon dioxide and sulfur dioxide. Therefore, this process cannot be said to be entirely satisfactory, because a part of the active carbon is consumed and the sulfuric acid adsorbed in the active carbon is reduced to sulfur dioxide which is of less commercial value.

Accordingly, an object of the present invention is to provide a process which enables the recovery of the sulfuric acid adsorbed in the active carbon in a commercially valuable form without any consumption of the active carbon, and at the same time enables the regeneration of the active carbon to a state fit for repetitive use.

Other objects of this invention will be obvious from the contents of the specification hereinafter disclosed.

These objects of this invention can be accomplished by the process as earlier disclosed in this specification.

The first step of causing adsorption of the sulfur compounds in the combustion gas onto active carbon sulfuric acid according to this invention comprises contacting the combustion gas with active carbon at a temperature ranging from room temperature to 250° C., preferably 100–200° C. The sulfur-trioxide formation reaction by oxidation of sulfur dioxide occurs at a temperature of about 50° C. and above, when the combustion gas is contacted with active carbon at the specified temperature range, the adsorbed sulfur dioxide is almost immediately oxidized by the oxygen contained in the gas and is converted into sulfur trioxide which in turn is converted into sulfuric acid by the action of the steam also present in the gas. Therefore, the first step of this invention may be regarded as the dry adsorption process similar to the Reinluft process.

However, so far as the second step of recovering the sulfuric acid adsorbed in the active carbon as well as regenerating the active carbon is concerned, this invention is entirely different from the Reinluft process. According to the invention, ammonia is caused to act upon the active carbon adsorbed with sulfuric acid to form ammonium sulfate, and to simultaneously regenerate the active carbon. The active carbon is thus regenerated without any loss, and can be re-used after simply being washed with water and dried. The ammonium sulfate recovered as a low cost side product can be advantageously utilized for fertilizer and other usages.

In the past, a process of injecting ammonia into the combustion gas for the purpose of removing therefrom the sulfur compounds in the form of ammonium sulfate-sulfite mixture was proposed. Utilization of this ammonium sulfate-sulfite mixture, for example as a fertilizer, is however impossible, because of the contamination. Moreover, the ammonium sulfite primarily formed unless dissociated, is highly volatile. Its sublimation point is around 150° C. and because of its low concentration (0.1–0.3 vol. percent) it is not separated in the boiler but is transmitted with the flue gas into the chimney. Since, like all other ammonium salts, it forms an aerosol when the smoke column cools, in other words, since it appears locally in highly concentrated form on making contact with the soil and since, like sulfur dioxide, but in contrast to ammonium sulfate, it is a highly toxic plant poison, the injection of ammonia into the flue gas to recover the ammonium sulfate-sulfite mixture seems hardly advisable.

On the other hand, according to the present invention, the active carbon adsorbed with the sulfuric acid is (1) contacted with ammonia in the presence of an aqueous solution of ammonium sulfate or of water, or (2) it is first contacted with an ammonia-containing gas and then extracted with an aqueous solution of ammonium sulfate or with water, the sulfuric acid is separated into the aqueous phase in the form of non-toxic ammonium sulfate and at the same time the active carbon is regenerated without any loss or capacity degradation the harmful sulfur compounds contained in the combustion gas consist mainly of sulfur dioxide and trioxide, which are normally present in the combustion gas at the concentration in the order of at least 1000 p.p.m. in terms of sulfur. (The ratio of $SO_2$:$SO_3$ is about 90–95: 10–5 by volume.)

According to the present invention, these gases can be removed from the combustion gas with an efficiency of at least about 95%.

This invention is based upon the facts described above. Typical examples of this invention are shown below.

Example 1

An active carbon layer was set in the flue through which the combustion gas from a fuel oil combustion furnace passed. The temperature of the gas at the place of setting was 180° C. By causing the combustion gas to pass through the said layer from the bottom to the top, the concentration in terms of sulfur of sulfur dioxide and trioxide in the gas was reduced from 1000 p.p.m. to below 50 p.p.m.

When some lowering in the activity of the active carbon was observed with the increase in the amount of the sulfur compound adsorbed therein, the active carbon was acted upon by ammonia in the presence of water. Ninety-five weight percent of the sulfuric acid contained in the active carbon was thus recovered as ammonium sulfate. The remaining active carbon was washed with water, dried and then again set at the same place in the flue as described above, and which showed a substantially equal degree of effectiveness as before.

Example 2

An active carbon layer was set in the flue through which the combustion gas from a fuel oil combustion furnace passed. The temperature of the gas at the place of setting was 150° C. By causing the combustion gas to pass through the said layer from the bottom to the top, the concentration in terms of sulfur of sulfur dioxide and trioxide in the gas was reduced from 1000 p.p.m. to below 40 p.p.m.

Then the active carbon adsorbed with sulfuric acid was contacted with an ammonia-containing gas so as to form ammonium sulfate in the active carbon, and then extracted with water. Thus 95 weight percent of the sulfuric acid contained in the active carbon was recovered as ammonium sulfate. The remaining active carbon was washed with water, dried and then again set at the same point in the flue as substantially equal degree of effectiveness as before.

I claim:
1. A process for removing sulfur dioxide and sulfur trioxide from a combustion gas containing same, said process comprising contacting a combustion gas containing sulfur dioxide and sulfur trioxide with active carbon at a temperature between room temperature and 250° C. to adsorb the sulfur dioxide and sulfur trioxide onto the active carbon, the thusly adsorbed sulfur dioxide and sulfur trioxide subsequently reacting with oxygen and steam also present in the combustion gas to form sulfuric acid on the active carbon, contacting the active carbon having sulfuric acid formed thereon with aqueous ammonia containing ammonium sulfate to thereby convert the sulfuric acid to ammonium sulfate and regenerate the active carbon and recovering the ammonium sulfate.

2. A process as claimed in claim 1 comprising washing and drying the regenerated active carbon and recovering same for use in the adsorption step.

3. A process as claimed in claim 1 wherein the temperature is 100°–200° C.

References Cited

UNITED STATES PATENTS 2,589,750    3/1952    Van Nouhys _____ 252—442

FOREIGN PATENTS 337,348    10/1930    Great Britain.

OSCAR R. VERTIZ, *Primary Examiner.*

E. C. THOMAS, *Assistant Examiner.*

U.S. Cl. X.R.

23—2, 168, 178, 175; 252—412